May 16, 1933. M. B. BLEECKER 1,909,450
HELICOPTER
Filed July 7, 1925 6 Sheets-Sheet 1
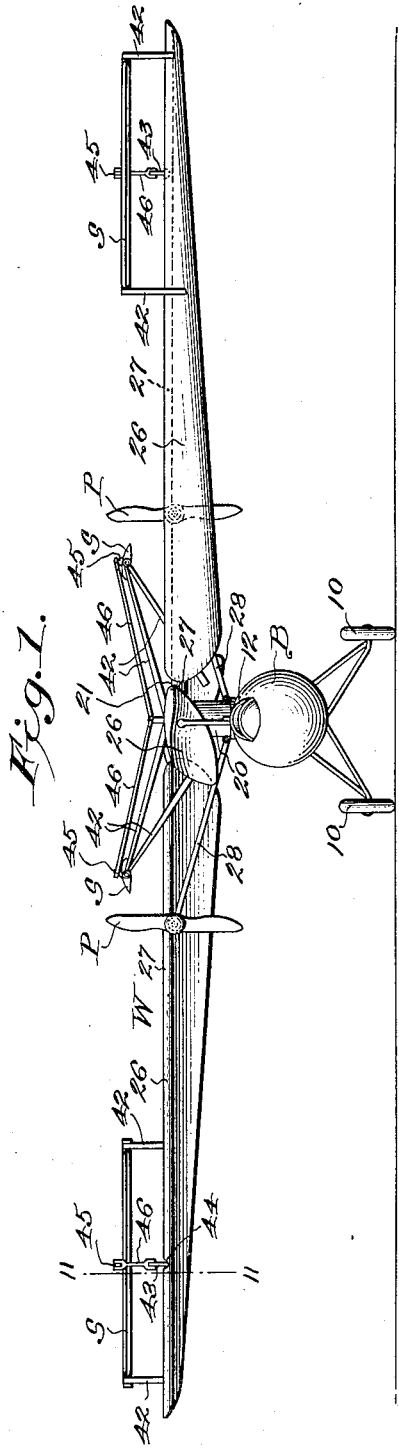
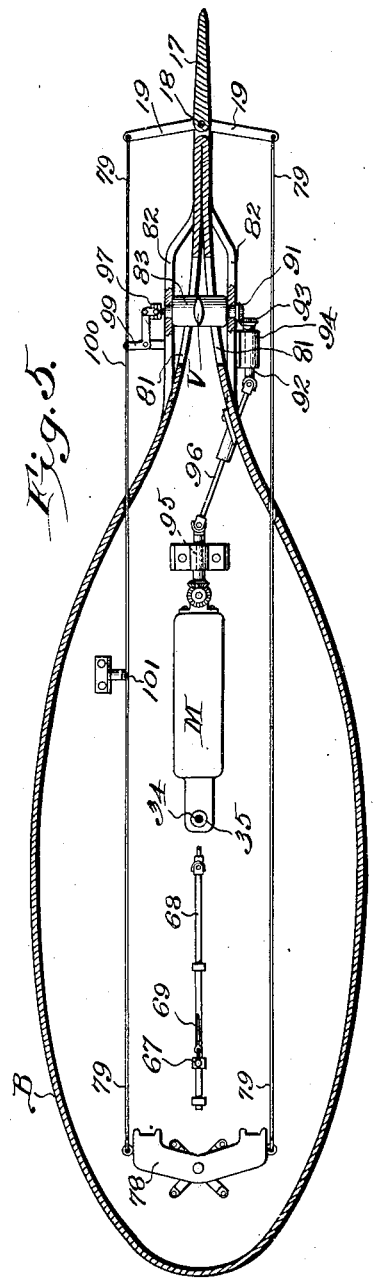
Inventor
Maitland B. Bleecker
By Allen E. Peck
Attorney

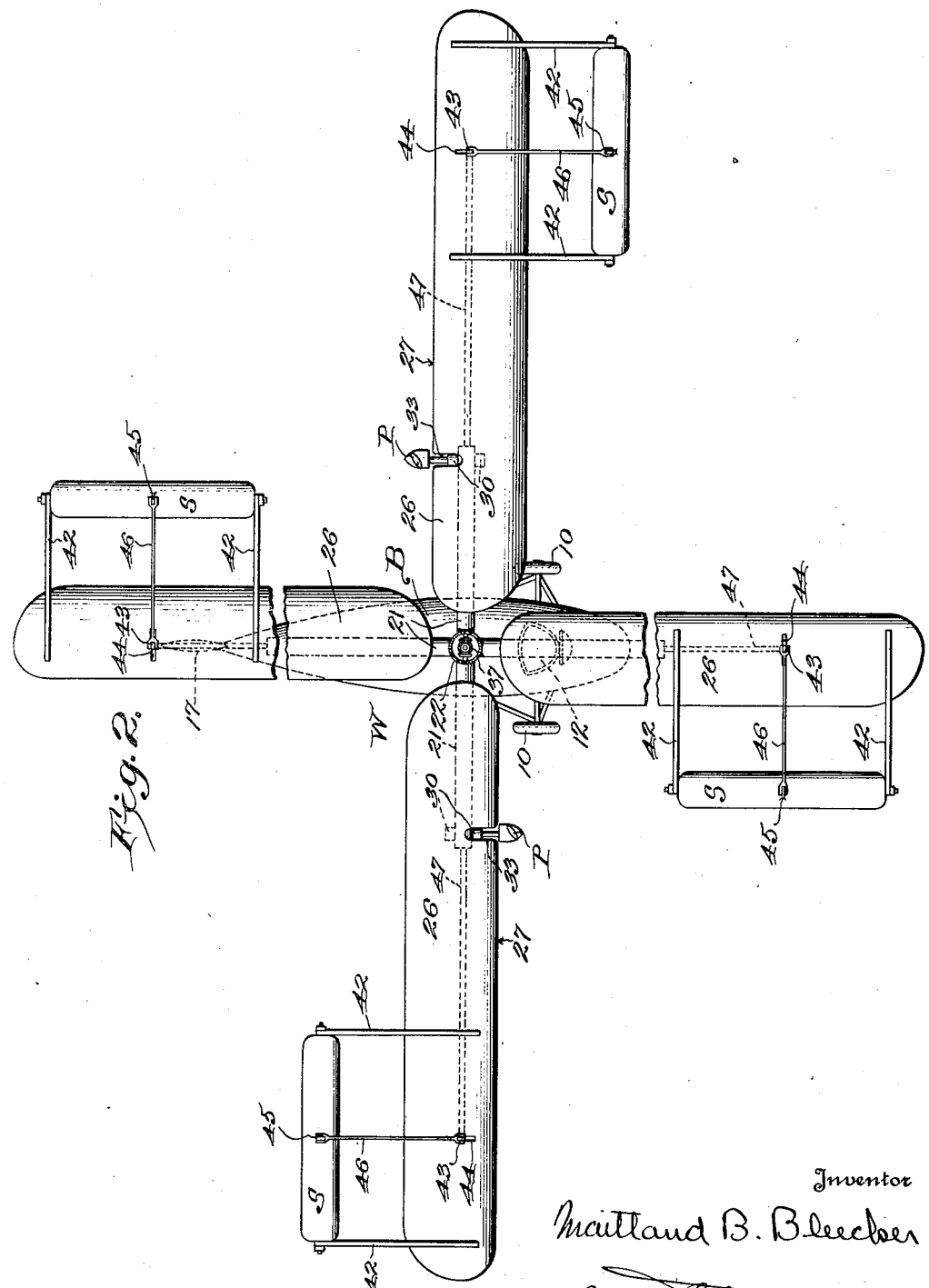

May 16, 1933. M. B. BLEECKER 1,909,450
HELICOPTER
Filed July 7, 1925 6 Sheets-Sheet 3
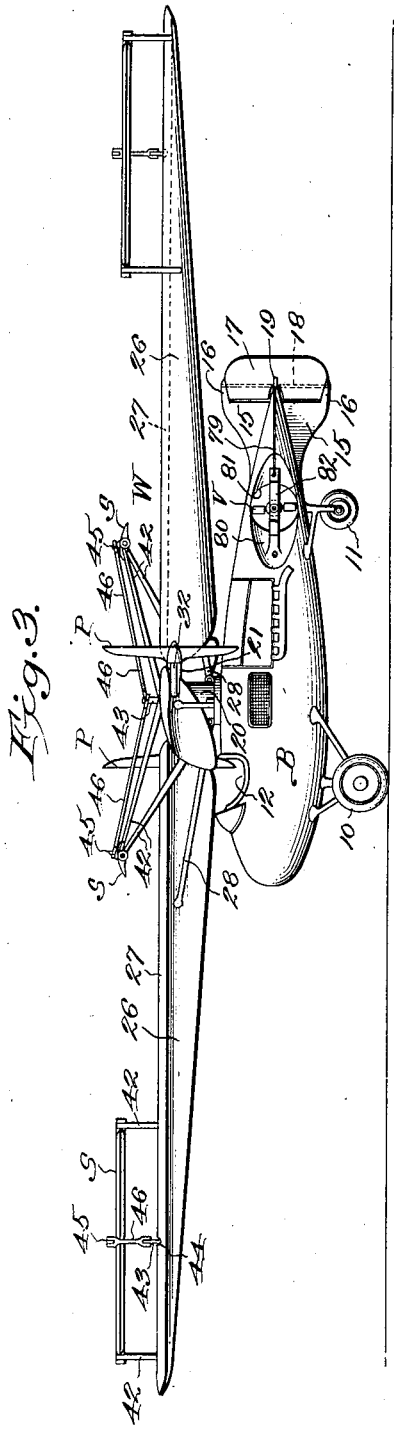
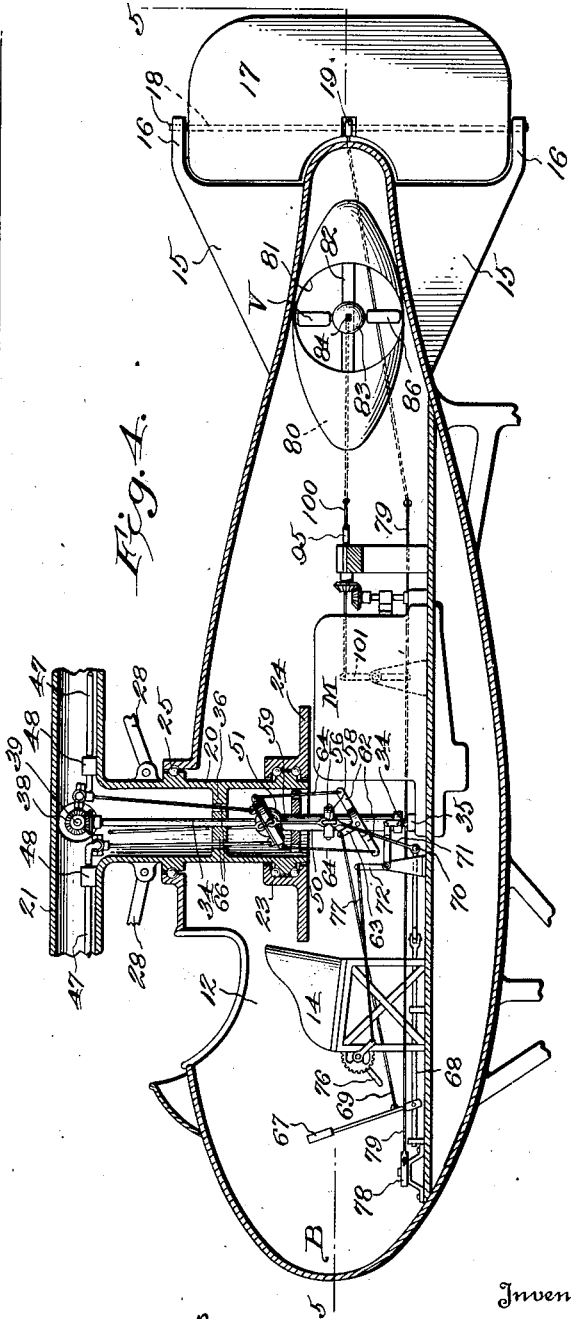
Inventor
Maitland B. Bleecker
By 
Attorney

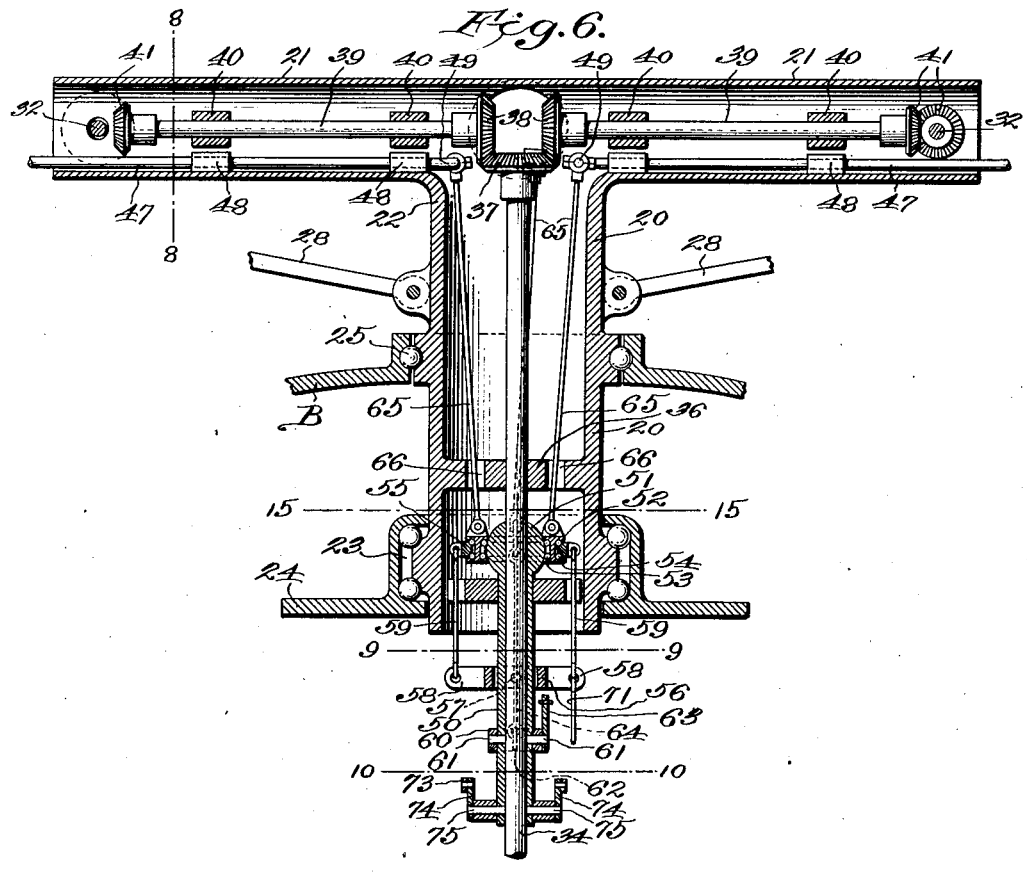
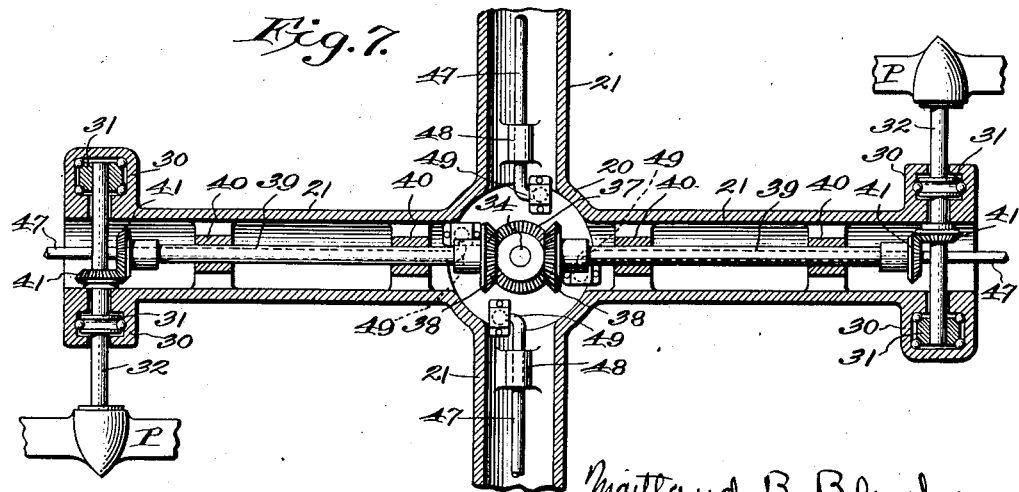

May 16, 1933.  M. B. BLEECKER  1,909,450
HELICOPTER
Filed July 7, 1925  6 Sheets-Sheet 5
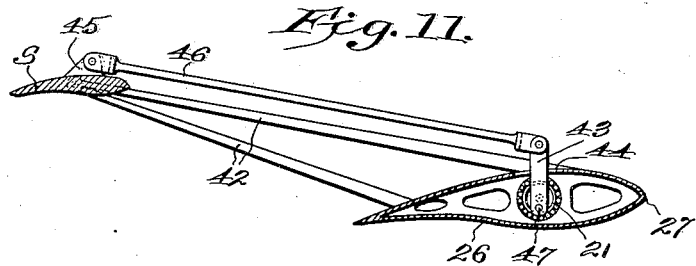
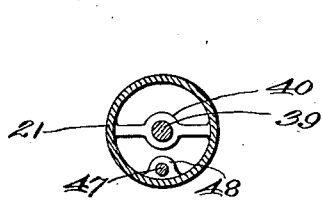
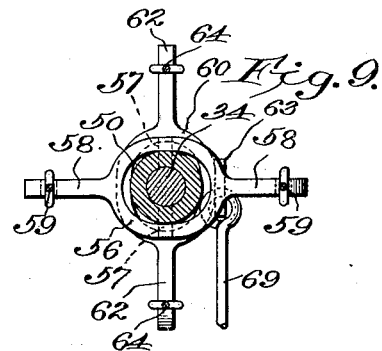
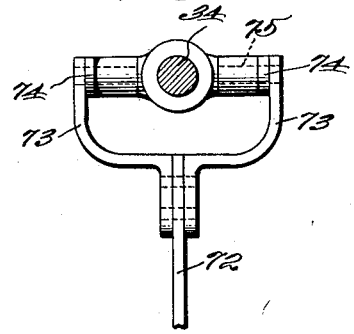
Inventor
Maitland B. Bleecker
By Albert E. Fech
Attorney May 16, 1933.   M. B. BLEECKER   1,909,450
HELICOPTER
Filed July 7, 1925   6 Sheets-Sheet 6
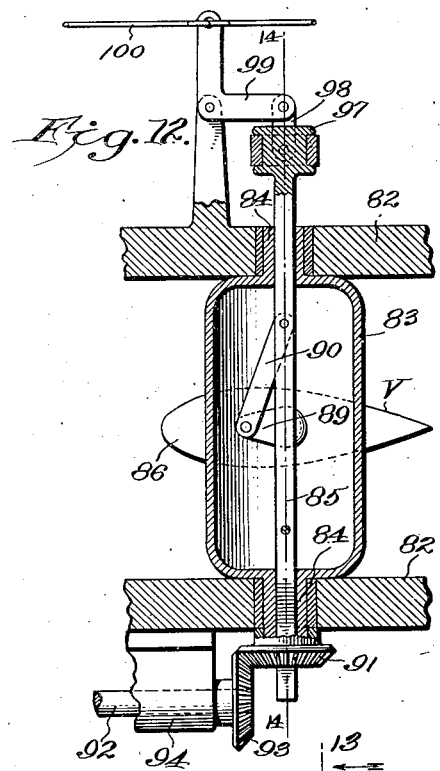
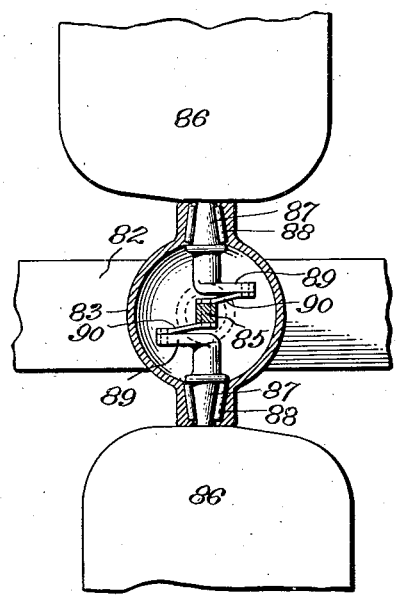
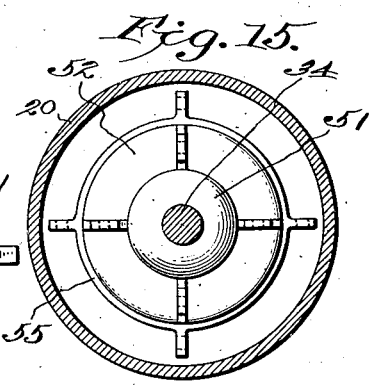
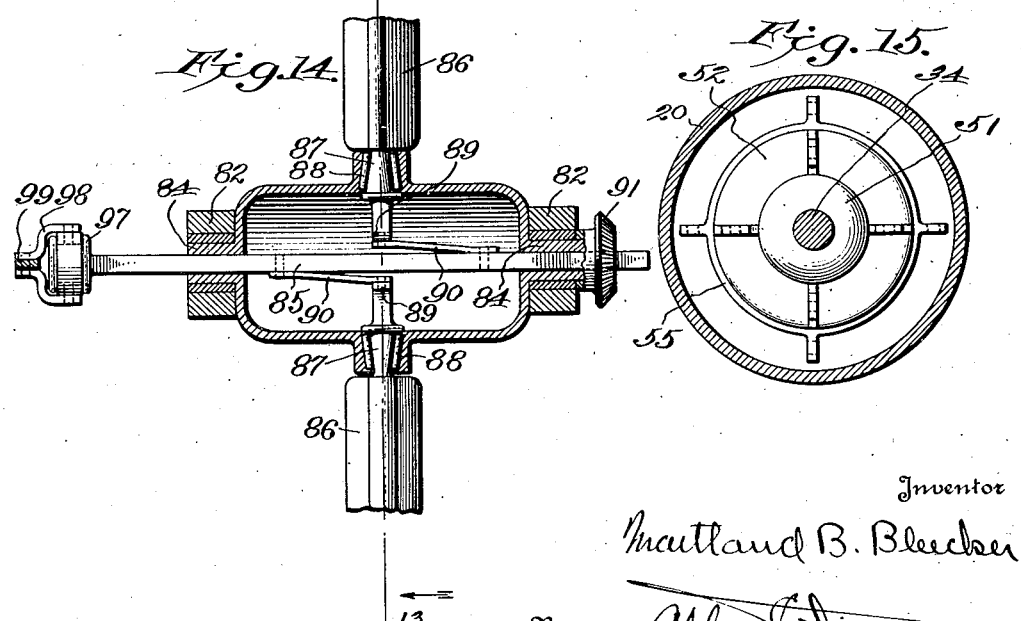
Inventor
Maitland B. Bleecker
By Allen E. Peck
Attorney Patented May 16, 1933

1,909,450

UNITED STATES PATENT OFFICE

MAITLAND B. BLEECKER, OF PHOEBUS, VIRGINIA

HELICOPTER

Application filed July 7, 1925. Serial No. 42,022.

This invention relates to certain improvements in helicopters; and the nature and objects of the invention will be readily recognized and understood by those skilled in the arts involved, in the light of the following explanation and detailed description of the accompanying drawings, illustrating what I at present consider to be the preferred embodiments or aerodynamical and mechanical expressions of my invention from among various other forms, arrangements, combinations and constructions of which the invention is capable within the spirit and scope thereof.

More specifically the present invention is directed to those general types of helicopters in which direct vertical lift for securing vertical translational movement or vertical flight of the craft is developed by rotating screws or aerofoils in a horizontal plane about a vertical axis, and among the basic and fundamental problems and difficulties encountered in a design of such types are those of vertical descent without power; controlled horizontal translational movement or horizontal flight; directional control of the craft in both vertical and horizontal translation or flight; and inherent or automatic stability of the craft in and under all flight conditions in both horizontal and vertical translation, independently of and simultaneously with arbitrary directional control of the craft. Growing out of these fundamental problems of the type are certain design and structural difficulties which must be considered in the solution thereof in order to maintain the requisite structural factor of safety while securing the desired aerodynamical efficiency in the resulting craft, through the maximum utilization of the available power and the maximum reduction in weight and parasite resistance with resulting increase in useful load and flight performance.

One of the main and primary objects of the invention is to provide a helicopter of the general type referred to, characterized by the use of aerofoils or lift surfaces mounted for rotation in a horizontal plane through the medium of propellers carried by the surfaces so as to secure a gyroscopic action giving partial inherent stability, in which the aerofoils or lift surfaces are so designed and so mounted and disposed as to permit of controlled low velocity descent of the craft without motor power through the lift developed by the aerofoils freely rotating in the same direction during descent.

Another object of the invention is to provide for inherent stability in a helicopter, of the type characterized by aerofoils or lift surfaces rotated in a horizontal plane, through automatic selective adjustment of the angles of incidence or attack of the respective aerofoils to counteract and neutralize forces acting on the craft tending to disturb the equilibrium thereof and to maintain the lift of the aerofoils in a correct amount parallel to the axis of rotation, in and during all conditions of flight, both vertical and horizontal.

Another object of the invention is to provide for arbitrary directional control of a helicopter, of the type in which the lift is developed by horizontally rotated aerofoils or lift surfaces, through the establishment of unequal lifts by said aerofoils at predetermined points in their plane of rotation to create a component of the resulting lift acting in the desired direction and resulting in translation of the craft in such direction.

Another object of the invention is to provide a design of helicopter characterized by horizontally rotated aerofoils or lift surfaces developing the lift for the craft and individually adjustable to vary their respective attack angles, in which inherent stability is secured through automatic adjusting of the aerofoils to vary the lift thereof, and in which arbitrary directional control of the craft is obtained by selective adjustment of the angles of the respective aerofoils, superimposed upon and independently of the automatic stabilizing function which operates under all flight conditions.

A further object of the invention is to provide a design of helicopter characterized by horizontally rotated aerofoils, with secondary aerofoils automatically controlling the respective lift of each aerofoil to secure inherent stability in the craft, and which secondary or auxiliary aerofoils are arbitrarily selectively operable to directionally control the helicopter in flight without impairing or interrupting the stabilizing function and operation of these secondary surfaces.

A further object of the invention is to provide a design of helicopter characterized by horizontally rotated aerofoils, developing the lift for the craft, with secondary aerofoils automatically controlling the respective lift of each aerofoil to secure inherent stability, and which secondary aerofoils are capable of being simultaneously equally adjusted, thereby varying the lift of main horizontally rotated aerofoils equally for vertical translation, or ascent and descent, and without impairing or interrupting the stabilizing function and operation of these secondary surfaces.

A further object of the invention is to provide in a helicopter, of the type embodying a fuselage or body and aerofoils mounted for rotation thereon in a horizontal plane, for the control of the fuselage or body during so-called hovering or substantial "up motion" conditions of the helicopter to neutralize the tendency of and prevent horizontal rotation or "spinning" of the body around the axis of rotation of the lift developing aerofoils.

A further object of the invention is to provide control operating mechanism for a helicopter presenting the foregoing objects, which mechanism is of simple, compact design and arrangement, positive and efficient in operation and so designed as to reduce the possibilities of mechanical failure in flight to a minimum, while maintaining a low weight factor for the mechanism.

A further object of the invention is the provision in a helicopter of the type embodying airfoils or lift surfaces rotated in a horizontal plane by propellers carried by and rotated with such surfaces, of a low weight and mechanically efficient drive mechanism for transmitting power to such propellers.

Another object of the invention resides in the provision of a mechanically and aerodynamically efficient design, arrangement and construction of helicopter of the general type hereinbefore referred to.

With the foregoing general objects and results and certain other objects and results in view, which other objects and results will be readily apparent to and understood by those skilled in the aeronautical art, the invention consists in certain novel features in design and in construction and arrangement of elements, as will be more fully referred to and specified hereinafter.

Referring to the accompanying drawings in which similar reference characters refer to corresponding parts and elements throughout the several figures thereof:

Fig. 1 is a view in front elevation of a helicopter embodying features of the invention.

Fig. 2 is a top plan view of the helicopter of Fig. 1.

Fig. 3 is a view in side elevation of the helicopter of Figs. 1 and 2.

Fig. 4 is a vertical longitudinal section taken through the body or fuselage of the helicopter and the hub and column or mast for the horizontally rotating aerofoils, and showing the control operating mechanism for the helicopter and a portion of the drive mechanism for the aerofoil rotating propellers.

Fig. 5 is a horizontal longitudinal section through the body or fuselage taken on the line 5—5 of Fig. 4.

Fig. 6 is a vertical transverse section through the aerofoil hub and rotating mast or column showing the mounting therefor, and showing portions of the control operating mechanism and the driving mechanism for rotating the aerofoils.

Fig. 7 is a horizontal section through the aerofoil mounting hub and supporting shafts, showing the mounting and arrangement of the aerofoil rotating propellers and drive mechanism therefor.

Fig. 8 is a detail transverse section taken on the line 8—8 of Fig. 6.

Fig. 9 is a detail transverse section taken on the line 9—9 of Fig. 6.

Fig. 10 is a detail transverse section taken on line 10—10 of Fig. 6.

Fig. 11 is a detail transverse section taken through one of the aerofoils and secondary or stabilizing surface thereof, showing the supporting truss for the stabilizing surface and the operating connections for the stabilizing surface.

Fig. 12 is a detail sectional view through the fuselage controlling variable pitch propeller and mounting therefor at the tail of the fuselage, with portions of the driving and control mechanism therefor operatively coupled therewith.

Fig. 13 is a detail sectional view of the fuselage controlling variable pitch propeller taken on the line 13—13 of Fig. 14.

Fig. 14 is a detail sectional view of the fuselage controlling propeller with the driving and operating mechanism therefor taken on the line 14—14 of Fig. 12.

Fig. 15 is a horizontal transverse section through the hollow rotatable aerofoil assembly column or mast taken on the line 15—15 of Fig. 6.

According to the mechanical and aerodynamical expressions of the principles and various features of the present invention disclosed in the accompanying drawings, purely by way of example and not of limitation, for purposes of illustration and explanation to enable those skilled in the art to understand the same, a helicopter of that general type characterized by screws or aerofoils rotatable in a horizontal plane to develop the vertical lift for flight is shown as embodying the invention. However all features of the invention are not limited to the general type of helicopter disclosed but are of general adaptation, while certain features of the invention are applicable to other types of aircraft where similar or equivalent conditions are encountered, as will appear from the following description.

In the illustrated embodiment a helicopter is formed which includes a body or fuselage B upon which is mounted for rotation in a horizontal plane thereabove an aerofoil assembly W to develop a vertical lift for causing vertical translation of the craft. The body or fuselage B is of more or less conventional streamline form provided with a chassis or landing gear 10 of the "split-axle" land type, although not so limited at the forward portion thereof and a landing wheel 11, or tail skid if found desirable at the tail end of the fuselage, all mounted and arranged in accordance with more or less conventional design practice. It will be understood that, if desired, landing gear of the water type or combined water and land type can be employed and it is not intended to in any way limit the invention to the type of landing gear disclosed. A pilot's cockpit 12 is formed in the forward portion of the fuselage B, opening through the upper wall or skin thereof, all in the usual or any other desired manner, and a pilot's seat 14 is mounted in position within cockpit 12 below the opening thereof, as clearly shown in Fig. 4 of the accompanying drawings. At the tail end of the fuselage B, upper and lower alined vertical fins are mounted to form a vertical stabilizer 15, the trailing edge of which in the example hereof terminates forwardly of the rear or tail end of fuselage B. Rearwardly extending horizontally disposed arms or brackets 16 are provided at the upper and lower rear ends of stabilizer 15, between which a rudder 17 is pivotally mounted in alinement with stabilizer 15, on a vertical axis 18. The rudder 17 is provided intermediate the upper and lower ends and in line with the tail end of fuselage B, with the usual control horns 19 extending from opposite sides thereof and by which the rudder is swung horizontally in the usual manner understood in the art. (See Figs. 4 and 5).

Within fuselage B any desired source of power is mounted, which in the present example is typified by the vertical motor M of the internal combustion motor type, shown diagrammatically in Figs. 4 and 5, as disposed in the fuselage aft of the cockpit 12 and mounted longitudinally of the fuselage. The motor M of the desired type is not limited to mounting in the fuselage B but can be mounted at any other desired or suitable point on the craft, as will be referred to hereinafter.

The fuselage B designed and arranged in the general manner above described, has the aerofoil or lift surface assembly W mounted thereon and disposed thereabove for rotation in a horizontal plane around a vertical axis. The mounting for the aerofoil assembly W, in the mechanical adaptation presented herewith, embodies a main hollow hub column or mast 20 rotatably supported on fuselage B in a vertical position and having the hollow arms or shafts 21 extending radially from equi-distant points around the upper end or hub 22 of column 20, with these shafts 21 disposed horizontally and in communication with and opening into the hollow hub column or mast 20, as is shown particularly and in detail by Figs. 4, 6, and 7 of the drawings. The shafts 21 form and provide supports upon and on which the aerofoils or lift surfaces are mounted in the assembly W, so as to extend radially from column 20 in a horizontal position, as will be referred to and described hereinafter.

The hub column 20 is mounted on fuselage B in a vertical position extending through the upper wall thereof a distance thereinto at a point intermediate the pilot's cockpit 12 and motor M, in the present example, and having the upper end or hub 22 thereof with shafts 21 extending radially therefrom disposed a distance above and spaced from the fuselage B. The lower or inner end of column or mast 20 is rotatably mounted and journaled in any suitable type or design of thrust bearing 23 which surrounds the same and is supported on and carried by a column supporting platform, bulkhead or frame 24 extending transversely of the fuselage B and suitably fixed therein and thereto. At the upper portion of column 20 a second bearing 25 is mounted and carried by the upper wall of fuselage B, surrounding and in which the column 20 is rotatably journaled, as clearly shown in Figs. 4 and 6 of the drawings. Thus, in mounted position the column or mast 20 is freely rotatably mounted on fuselage B with the hub 22 and radial shafts 21 disposed above the upper wall of the fuselage and rotatable around a vertical axis to rotate the shafts 21 in a horizontal plane about such axis.

The aerofoil assembly W is composed of a series or set of aerofoils, lift surfaces or wings 26 which are mounted on and longitudinally of and extend outwardly, in the present instance, a distance beyond the series of radial shafts 21, respectively, disposed around the hub or outer end of rotatable column 20. In the design of helicopter here disclosed, a series of four shafts 21 are provided spaced equally distant around hub 22, so that these shafts are disposed in diametrically opposite pairs, with the result that the aerofoils 26, respectively, mounted thereon form alined pairs of horizontally disposed aerofoils or wings with each pair of wings, respectively, forming in effect a cantilever aerofoil or wing and mounting thereof, from and across the rotatable column or mast 20, as will be apparent by reference to Figs. 1, 2, and 3 of the drawings. The shafts 21, being fixed to and rigid with column 20, are disposed longitudinally of the wings and are preferably arranged to serve and function as wing beam or longitudinal structural elements of the aerofoil or wing frames and internal trussing thereof, and due to the cantilever mounting and arrangement of aerofoils 26 and shafts 21, these shafts are not required to extend the full span of each aerofoil 26 but can be terminated a considerable distance inwardly from the tips thereof, as shown by dotted lines in Fig. 2. Due to the foregoing considerations the weight of the aerofoils 26 and mounting therefor can be maintained at a minimum while retaining the necessary structural strength and rigidity.

The aerofoils 26 can be constructed of conventional or other suitable form and of the desired section, aspect ratio and area to develop a vertical lift when rotated in a horizontal plane, and are mounted on the shafts 21 for rotation therearound to vary and adjust the respective angles of incidence or attack thereof so as to vary the lift developed thereby. Suitable bearings are provided of any desirable type for rotatably mounting the aerofoils 26 on shafts 21 and for confining the aerofoils against and taking up the thrust of longitudinal movement on the shafts 21. In order to further strengthen the aerofoil assembly and mounting, trusses are formed between the rotatable column 20 and the supporting and mounting shafts 21, and embody struts 28 extending upwardly from column 20 adjacent the fuselage B, to the outer ends of the shafts 21, respectively, to which they are fixed. The lower surface or skin of the aerofoils 26 is slotted or formed with suitable openings therein surrounding and through which the struts 28, respectively, extend to permit of rotation of the aerofoils on the shafts 21 without interference, as will be readily understood. The aerofoil or lift surface assembly W is rotatable with column 20 around a vertical axis to rotate the aerofoils 26 in a horizontal plane in the same direction over and above fuselage B to develop a vertical lift.

The aerofoils or lift surfaces 26 mounted on and carried by column 20 and shafts 21, are rotated by power from the motor M within fuselage B, and the invention provides for rotation of the aerofoils by an indirect application of power thereto, through the medium of propellers P mounted on and carried by the aerofoil assembly W. In the particular example hereof, two of such propellers of the tractor type are utilized, mounted on and carried by a diametrically opposite pair, respectively of the aerofoils 26, and disposed in advance of the leading edges 27 thereof for rotation in vertical planes. The propellers P are located at points outwardly along the span of the aerofoils 26 adjacent and in line with the outer ends of the shafts 21 upon which the respective aerofoils 26 are mounted, and are supported from and carried by such shafts 21. Referring now to Figs. 6 and 7 in particular, the outer ends of shafts 21 which carry propellers P are provided with the transverse horizontally disposed shaft and bearing housings 30 extending beyond opposite sides thereof and having the shaft bearings 31, one at least of which is of the thrust type, mounted in the opposite outer ends thereof. A propeller shaft 32 is mounted extending longitudinally of each housing 30, transversely across the shaft 21 thereof, and journaled and confined in the bearings 31, with one end of the shaft 32 extended outwardly beyond the leading edge of the aerofoil 26 mounted on such fixed shaft 21, respectively. (See Figs. 2 and 3). In that the position of the leading edges 27 of the opposite aerofoils 26 are in relative opposite positions, the propeller shafts 32 are extended from opposite sides of the fixed shafts 21, respectively, and the propellers P are mounted on the extended ends of shafts 32 and positioned for rotation thereby in a vertical plane in advance of the leading edges 27 of the respective aerofoils 26. The aerofoils 26 through which propeller shafts 32 extend have a portion thereof cut away to form slots or openings 33 (see Fig. 2) therein through which the propeller shafts 32 extend and which permit of the aerofoils being rotated on shafts 21 to vary the angles of incidence thereof.

Propellers P are rotated by shafts 32 through a drive mechanism from the power unit or motor M within the body or fuselage B, and this drive embodies a main shaft 34 operatively connected at one end to suitable gearing (not shown) within a gear box 35 at the forward end of motor M (see Figs. 4 and 5) and operated thereby, and extends vertically and upwardly through the hollow rotatable hub column or mast 20 to the hub 22 and hollow radial aerofoil shafts 21 at the upper end of column 20. Any suitable bearing block and guide 36 is fixed in and extends transversely across hollow column 20 through which the drive shaft 34 extends (see Fig. 6). The upper end of drive shaft 34 is provided with the miter or bevel gear 37 in operative mesh with bevel gears 38 fixed on the inner ends of shafts 39 mounted in bearings 40 in the diametrically opposite hollow shafts 21 and extending longitudinally and outwardly through shafts 21 to the propeller shafts 32, to which they are operatively coupled by the meshed pairs of bevel gears 41, respectively.

Operation of motor M rotates drive shaft 34, and through gears 37 and 38 rotates the shafts 39, which drive the propeller shafts 32 through gears 41, and cause rotation of the propellers P at diametrically opposite points on and around the aerofoil assembly supporting column 20. The rotation of tractor propellers P by the drive mechanism, draws or pulls the freely rotatable aerofoil assembly W around the vertical axis of the column 20 and results in rotation of the aerofoils 26 in the same direction in a horizontal plane around such vertical axis, with the aerofoils maintained in fixed position with respect to each other extending radially from the vertical column 20. This rotation of aerofoils 26 in the direction of their leading edges 27 and at the proper angles of incidence develops a direct vertical lift therefrom and results in vertical translation or flight of the craft, as will be clear to those skilled in the aeronautical art. By the foregoing indirect application of the power to rotate the aerofoils 26 through rotation of the propellers P in a vertical plane to draw or pull the aerofoils around, a gyroscopic action is developed by the rotating aerofoil mass which tends to overcome forces acting to change the plane of rotation thereof and thus establishes partial inherent stability for the craft in flight.

Complete inherent stability in a helicopter of the invention is obtained through automatically functioning auxiliary or secondary aerofoils or lift surfaces for varying the angle of incidence of each main aerofoil or lift surface 26 to vary the lift developed thereby, and in the design of helicopter of the present example, an auxiliary surface or secondary aerofoil S is mounted on and carried by each aerofoil or lift surface 26, or the mounting therefor, for controlling the angle of incidence thereof. These auxiliary or secondary stabilizing aerofoils S are mounted in position spaced rearwardly from the trailing edge of each main aerofoil 26 adjacent the outer or tip portions thereof, and disposed in a horizontal plane thereabove, although if desired or found expedient, such auxiliary aerofoils can be disposed in advance of the main aerofoils 26 and leading edges 27 thereof, and/or in a horizontal plane therebelow. The unit or assembly formed by each main aerofoil 26 and auxiliary aerofoil S carried thereby, is rotatable around an axis formed by and along the shaft 21, that is, the pitch axis of the main aerofoil, and is so designed, arranged and mounted that the center of gravity of the unit is located at a point removed or off this axis of rotation of the unit. The location of the center of gravity for each unit is dependent upon the particular design and arrangement of a unit, the essential feature being that the center of gravity thereof must not be on the axis of rotation for the unit. By thus locating the center of gravity for each unit removed from the pitch axis of the unit, the moments resulting from this displacement of the center of gravity, namely, the static weight moment and the moment due to a component of the centrifugal force, enter into the equilibrium equation, and because these moments are not influenced by changes in airflow velocity and direction, it is readily seen that when such disturbances occur, these moments combined with the aerodynamic moments tend to rotate the unit so as to maintain the lift approximately a constant. The auxiliary aerofoils are pivotally mounted and supported on and disposed between spaced trusses or outriggers 42 fixed on and extending rearwardly and upwardly from the upper sides of the aerofoils or lift surfaces 26, respectively, and are preferably suitably connected with and supported from the aerofoil frames or trussing (not shown), so as to transmit forces imposed thereon to such frames and trussing.

The auxiliary or secondary stabilizing aerofoils S are operatively connected and coupled by means of their trusses or outriggers with the main aerofoils 26, so as to automatically rotate the aerofoils 26 on shafts 21 and thereby vary or adjust the angles or attack thereof, respectively. In order to compensate and correct for errors, inaccuracies and the like which may arise in the construction or otherwise, of a design of helicopter of the invention, such as variations or errors in the proper location of the centers of gravity for the main and auxiliary areofoil units, as well as other conditions which may be present, provision is made for securing a differential movement or change in the relative angle between each main aerofoil and its auxiliary aerofoil, as the units rotate around axes 21. In the present example, a possible arrangement is shown whereby the relative angle between each main aerofoil and its auxiliary aerofoil is varied to increase the angle of attack of the auxiliary aerofoil as the angle of attack of the main aerofoil is decreased, and to decrease the auxiliary aerofoil attack angle as the main aerofoil angle is increased. Obviously, the arrangement can be such as to secure a relative angle change the reverse of the foregoing, or to eliminate any change or variation in the relative angle, having this angle, if any, remain unchanged in rotation of the main aerofoils and their auxiliary aerofoils as units around the axes 21, respectively. In any case the fundamental principle by which the center of gravity of each aerofoil unit is located removed from the axis of rotation of the unit remains and is present. A normally stationary stability lever 43 (see Fig. 11 in particular) is mounted and supported from each aerofoil supporting shaft 21, in a manner hereinafter described and explained, and extends in a vertical position upwardly through and above each aerofoil 26, in line with and forwardly of the secondary stabilizing aerofoils S, respectively, supported from the aerofoils 26. The upper skin or surface of each aerofoil 26 is slotted or formed with an elongated opening 44, transversely of the aerofoils, through which the stability levers 43 extend, and which permit of rotation of the aerofoils 26 on shafts 21 as an axis, independently of the normally stationary, vertically disposed stability levers 43. A control or lever horn 45 is provided extending upwardly from each auxiliary or secondary aerofoil S, in line with the stability lever 43 on the respective aerofoil 26 from which areofoil S is mounted and supported, and the control horn 45 is operatively connected with and coupled to the respective stability lever 43, by a suitable push and pull rod or link 46, the rod 46 being pivotally connected at its ends to the upper ends, respectively, of control horn 45 and lever 43, as clearly shown in Fig. 11 of the drawings. Thus, each stability lever 43 is connected with the control horn 45 of its respective auxiliary stabilizing aerofoil S, so that rotation or vertical movement of an aerofoil S about the horizontal axis on which it is mounted between trusses 42, will result in a reverse rotation of the main aerofoil 26 about its horizontal axis defined by the supporting shaft 21, when the linkage including the push and pull rod 46 connecting auxiliary aerofoil S with the normally stationary lever 43, is as shown in Fig. 11. Now, in effect, the axis of each auxiliary aerofoil S rotates about the axis (shaft 21) on which the main aerofoil 26 rotates, and the pivotal connection of the outer end of rod 46 with horn 45, rotates about the pivotal connection of the inner end of rod 46 with outer or upper end of lever 43, as an axis, with the result, that upon elevation or raising of an auxiliary aerofoil S, its angle of attack is increased, and through rod 46 and trusses 42, the respective main aerofoil 26 is rotated in a reverse direction to decrease the angle of attack thereof. Upon lowering of an auxiliary aerofoil the reverse action on its repective main aerofoil 26 takes place, and the main aerofoil is rotated to increase its angle of attack.

In flight operation of the helicopter with the aerofoils 26 rotated in the same direction in a horizontal plane to develop the required vertical lift, by the motor M and hereinbefore described drive mechanism, partial inherent stability is secured from the gyroscopic action of the rotating aerofoil mass, while complete inherent stability is automatically maintained by the auxiliary stabilizing aerofoils S and their coupling with the main aerofoils 26. As the main aerofoils rotate around their vertical axis through the horizontal plane, upon any increase in velocity of the airstream or any upward component developing therein, as each auxiliary stabilizing aerofoil S passes therethrough it will be raised thereby which will increase its angle of attack, as explained, and simultaneously cause a rotation of the main aerofoil 26 with which connected, to decrease its angle of attack and thus decrease the lift developed thereby. This action takes place as the main aerofoils 26 successively pass through that portion of the airflow or stream in which the increased velocity is present, so that the lift of the aerofoils is decreased at such points and the stability of the craft maintained. As the main aerofoils 26 and their respective auxiliary aerofoils S pass from the influence of the increased velocity portion of the airstream, the auxiliary aerofoils are thus lowered with a decrease in their angles of attack and resulting increase in the angles of attack and of the lift developed by the main aerofoils 26. A decrease in velocity or downward component in the normal airstream or air flow, will similarly operate the auxiliary aerofoils, causing them to be lowered and to increase the angles of attack and the lift of the main aerofoils 26.

It will here be noted in the specific example here shown more or less diagrammatically, that due to the mounting and relative arrangement of the main aerofoils 26 and auxiliary aerofoils S, the angles of the attack of the auxiliary aerofoils S change more quickly and always in the opposite direction from the resulting angle changes of the main aerofoils or lift surfaces 26, respectively, but as hereinbefore explained and pointed out various other arrangements can be employed to meet the conditions encountered in a particular machine or design. By properly locating the pivotal connections of the rods 46 with the horns 45 and stability levers 43 and employing rods 46 of the proper lengths, the lift developed by each horizontally rotating aerofoil 26 is maintained in a correct amount parallel to the main vertical axis of the craft and the total lift remains constant, due to the balancing of the moments about the longitudinal centers or axes of aerofoils 26, by the automatic functioning of the stabilizing aerofoils S to bring and hold the craft in a state of equilibrium. As each main aerofoil or lift surface 26 with its stabilizing aerofoil S functions and operates independently of the others, the resulting stability of the craft is inherent and is automatically maintained under all flight conditions without attention from the pilot of the helicopter.

The directional control of the helicopter designed and constructed as above described, is carried out through the medium of the automatic stabilizing auxiliary aerofoils S, but independently of and without interruption to the automatic functioning of these aerofoils S to maintain the stability and equilibrium of the helicopter, so that in effect the directional control is superimposed on the automatic stabilization so that under directional control inherent stability is maintained. In the embodiment of directional control operating mechanism of the illustrated example, a rock shaft is mounted extending longitudinally through each aerofoil supporting shaft 21, in such position as to be beneath shafts 39 where they are present therein and journalled in suitable bearings 48 within hollow shafts 21. The rock shafts 47 are extended beyond the shafts 21, outwardly through and longitudinally of the stability aerofoils 26, to the inner ends of the stability levers 43, respectively, and the levers 43 are fixed on and swingable in and through aerofoil seats 44, by the shafts 47, respectively. The inner ends of rock shafts 47 are extended a distance into the upper end or hub 22 of rotatable column 20 and are disposed around and spaced from drive shaft 34 (see Figs. 6 and 7), with the ends thereof forming horizontally disposed cranks 49.

A shaft 50 is slidably mounted on and concentric with the lower end length of drive shaft 34 and extends upwardly a distance into the hollow rotatable column 20, from the lower end of shaft 34 and gear box 35. The hollow, slidable shaft 50 is journalled around member 34 mounted in the column 20, and thus hollow shaft 50 forms and provides a bearing in which shaft 34 rotates. The upper end of shaft 50 is provided and formed with a spherical or ball head 51 within column 20 and through which drive shaft 34 extends. Referring now to Fig. 6 of the drawings, a ring or annulus 52 is mounted on and circumferentially around the spherical head 51 of shaft 50, in normally horizontally disposed position, for rotation therearound and for movement thereon about the geometric center of spherical head 51 to any desired angle or inclination to the horizontal, by means of a series of ball bearings or the like 53 mounted around the inner surface of ring 52 and bearing on the spherical head 51. An outer series of ball or the like anti-friction bearings 54 is mounted around the outer side of ring 52, concentric with the inner series of bearings 53, and a collar 55 is mounted and confined around ring 52, concentric therewith and bearing on said ball bearings 54 to permit rotation of ring 52 within and independently of collar 55, while collar 55 is movable about the geometric center of spherical head 51 with the ring 52. The shaft 50 is maintained against rotation while slidable on shaft 34, and the collar 55 is likewise maintained against rotation while permitting rotation of ring 52 around head 51, between collar 55 and the head.

A frame 56 is pivotally mounted on and around the hollow slidable shaft 50 on opposite pivot pins 57 at the forward and rear sides of shaft 50 with the frame disposed in a horizontal position for vertical rocking movement laterally with respect to fuselage B and the helicopter. Opposite laterally extending arms 58 are provided on frame 56, and a link 59 connects the outer end of each arm 58, with the portion of the collar 55 thereabove, respectively, so that opposite lateral sides of the collar 55 are connected with the laterally disposed arms 58 of the rocking frame 56. The links 59 are pivotally connected at their lower ends to arms 58, and pivotally connected at their upper ends to suitable eyes or the like formed at opposite sides of the collar 55. Below rocking frame 58, a second rocking frame 60 is pivotally mounted in a horizontal position on and around shaft 50 for rocking movement vertically on opposite pivot pins 61 at opposite lateral sides of the shaft and at right angles to the pivot pins 57 of rocking frame 56. Frame 60 is provided with the opposite arms 62 extending forwardly and rearwardly therefrom, longitudinally or in a fore and aft direction with respect to the normal position of fuselage B, and with a vertically and upwardly disposed arm 63 at one side of frame 60 intermediate arms 62. The outer ends of arms 62 are pivotally connected to links 64 which extend upwardly to and are pivotally connected with the collar 55 at diametrically opposite points at the forward and rear sides thereof, respectively. In this manner, the ring 52 and collar 55 are mounted and confined on and around spherical head 51 of shaft 50, and by rocking frames 56 and 60 the position of the ring and collar can be adjusted and varied in a lateral and in a fore and aft direction with respect to fuselage B, for a purpose to be more fully explained.

The rotatable ring 52 is coupled and connected with the crank ends 49 of the rock shafts 47 at the upper or hub end 22 of hollow column or mast 20 by a series of push and pull rods or levers 65, respectively. These levers 65 are pivotally connected at their upper ends to the cranks 49 of rock shafts 47, respectively, and extend downwardly and are pivotally connected to the upper side of ring 52 at points spaced equidistant therearound. Guides 66 (see Figs. 4 and 6) are formed on the interior of hollow column 20 in and through which rods or levers 65 extend, to prevent twisting of these rods as they run with the rotation of column 20 and cause rotation of ring 52 around the spherical head 51 of shaft 50.

A pilot's control stick 67 is mounted forwardly of the pilot's seat 14, in the usual manner, and is operatively coupled with the rocking frames 56 and 60 on shaft 50, to permit of moving collar 55 and ring 52 to any desired angle or position on the shaft head 51. The control stick 67 is mounted on the shaft 68, referring now to Figs. 4 and 5 of the drawings, for pivotal movement longitudinally and independently of the shaft, and for lateral movement to rock the shaft, as will be readily understood. A push and pull rod 69 is pivotally connected to the lower end of control stick 67 and somewhat above the pivotal connection of control stick 67 to shaft 68 and extends rearwardly and is pivotally connected to the upper end of vertical arm 63 of rocking frame 60 on shaft 50 so that movement of the control stick forwardly or rearwardly correspondingly rocks frame 60 and raises and lowers the arms 62 thereof. The shaft 68 contains a universal joint, for mechanical reasons, and the rear extended end of shaft 68 is formed with a laterally and horizontally disposed crank 70 (see Fig. 4) which is pivotally connected to a rod or lever 71 extending upwardly to and pivotally connected with one of the lateral arms 58 of the rocking frame 56 on shaft 50, so that lateral movement of the stick 67 and rocking of shaft 68 will raise and lower crank 70, and through rod 71, will laterally rock the frame 56 on shaft 50.

The hollow shaft 50 mounted on drive shaft 34, which latter is rotatably journalled therewithin and extending therethrough, is maintained against rotation but is slidable on shaft 34 for vertical movement to raise and lower the same on and with respect to shaft 34, so as to raise and lower head 51 with the ring 52 and collar 55 mounted and assembled thereon. Pilot controlled operating mechanism is provided for raising and lowering shaft 50 with its head 51, and includes a bellcrank lever 72, referring here to Fig. 4 of the drawings, pivotally mounted adjacent the lower end of shaft 50 with one arm disposed horizontally and extending rearwardly to the shaft 50. The rear end of the horizontal arm of bell crank 72 is formed to provide a fork 73 (see Fig. 6) which extends on opposite lateral sides of shaft 50 and is pivotally connected by links 74 to laterally extending opposite pivot pins 75 on shaft 50. A pilot's operating lever 76 for controlling ascent and descent of the helicopter is mounted at any convenient point accessible from seat 14, referring now to Fig. 4, and in the example hereof takes the form of a bell crank pivotally mounted on the supporting structure of seat 14, for vertical movement, with one arm thereof pivotally connected to a push and pull rod 77 which extends to and is pivotally coupled with the vertically disposed arm of the bell crank lever 72. By raising or lowering pilot's lever 76, the slidable shaft 50 is raised or lowered on drive shaft 34, through the rod 77, bellcrank 72, and links 74 pivotally connecting shaft 50 therewith.

A directional control is provided for maintaining the body or fuselage B in the desired position in flight and for counteracting the tendency of the fuselage to rotate or "spin" about the vertical axis around which the aerofoil assembly W is rotated in flight operation. A rudder bar 78 is pivotally mounted forwardly of seat 14 within fuselage B, for swinging movement in a horizontal plane about a vertical axis, in the usual manner understood in the art. Control cables 79 are connected to opposite ends, respectively, of the rudder bar 78, and extend rearwardly and upwardly through fuselage B, outwardly through the tail end thereof, and are connected, respectively, to the opposite control horns 19 of the rudder 17. Movement of the rudder bar 78 in the proper direction will, through cables 79, move the rudder to cause swinging or movement of fuselage B in the corresponding direction, as will be clear by reference to Fig. 5 of the drawings.

In flight with the aerofoil assembly rotating in a horizontal plane around the vertical axis of column 20 mounted on fuselage B, the fuselage will tend to rotate around the vertical axis, and the rudder 17 may not be effective in counteracting or compensating for such movement during the condition of hovering or substantially no motion so the invention provides mechanism controlled by and synchronized with the rudder control for preventing rotation of the fuselage around the vertical axis of rotation of the aerofoil assembly W. At the tail end of fuselage B, the opposite sides thereof are formed with the longitudinally disposed depressions or channels 80, and a transverse circular opening or tunnel 81 is formed completely through the fuselage at these depressed portions. Opposite longitudinally disposed members or brackets 82 are extended from the fuselage rearwardly and horizontally across the depressions 80 and tunnel 81, spaced outwardly therefrom and secured at their rear ends to the tail of the fuselage. A variable pitch propeller V is mounted within the tunnel 81 for rotation in the vertical transverse plane thereof, on a horizontal axis disposed longitudinally of the tunnel and transversely of the fuselage and depressions 80, and formed by the hub barrel 83 journalled at its opposite ends in the brackets 82, to extend transversely of the fuselage axially through tunnel 81.

The construction and arrangement of the variable pitch propeller V and the mounting thereof in tunnel 81 on fuselage B, is shown in detail by Figs. 12, 13, and 14, of the accompanying drawings. The barrel 83 is provided with the opposite hollow stub shafts 84 rotatably journalled in bearings carried by the brackets 82, respectively, and a shaft or rod 85 is slidably mounted in the stub shafts 84, and extending longitudinally through and axially of barrel 83 and a distance beyond shafts 84, at the opposite ends thereof, respectively, so that barrel 83 and sliding shaft 85 rotate together on shafts 84, but shaft 85 is independently slidable through the stub shafts 84. The shaft 85 is preferably squared and the bores through the stub shafts 84 are similarly squared to slidably receive and fit the same, so shaft 85 is rotated by and with barrel 83. At diametrically opposite points at the longitudinal center of the barrel 83, propeller blades 86 are rotatably mounted on shafts 87 journalled in bearings 88 in the wall of barrel 83, with these propeller blades extending radially from the barrel and having their leading edges arranged at opposite sides of their axis of rotation in the barrel. The inner ends of the blade shafts 87 extend into the barrel and are formed with the cranks 89 extending therefrom disposed transversely with respect to shaft 85 and in opposite directions from shafts 87, respectively. Each crank 89 is pivotally connected with the adjacent side of shaft 85 by means of a link 90, so that when shaft 85 is slid or moved longitudinally of barrel 83, the propeller blades 86 are rotated on shafts 87 in opposite directions respectively, and their angles of incidence or attack correspondingly changed, being simultaneously increased or decreased.

The propeller V formed of barrel 83 and blades 86, is rotated as a unit around the longitudinal axis of barrel 83 and shafts 84, by a drive connected with the motor M. At one end of barrel 83 the shaft 84 thereof is provided with a bevel gear 91. A shaft 92 having a bevel gear 93 in operative mesh with barrel gear 91, is mounted in a bearing 94 on the exterior of the fuselage and is connected with a shaft 95 driven from the rear or after end of motor M, by a shaft 96 coupled by universal connections at its ends to motor driven shaft 95 and propeller driving shaft 92, respectively, as shown particularly by Fig. 5. Thus, variable pitch propeller V is rotated in a vertical plane within fuselage tunnel 81 around a horizontal axis disposed transversely of the fuselage and develops a thrust acting in either direction laterally of the fuselage, dependent upon the set and pitch of the blades.

The angle of the blades is varied by and in accordance with the direction of movement of rudder 17 by rudder bar 78. The end of slidable shaft 85 opposite stub shaft 84 on which gear 91 is mounted, is formed with a grooved head 97 in which the opposite arms of a fork 98 are mounted and confined to permit rotation of shaft 85 with fork 98 held against rotation. A bell crank 99 is pivotally mounted on and supported from the adjacent bracket 82 of the propeller mounting and has one arm thereof pivotally connected to fork 98, so that rocking of bell crank 99 will slide shaft 85 longitudinally of barrel 83 of the variable pitch propeller. The outer free arm of bell crank 99 is pivotally connected by a push and pull rod 100 to the upper arm of a vertically disposed lever 101 (see Figs. 4 and 5) pivotally mounted intermediate its ends to a suitable standard within the fuselage. The lower arm of lever 101 is coupled to and connected with the rudder control cable 79 adjacent thereto. The setting and relative arrangement of the rudder controlled mechanism for varying the angles or pitch of the propeller blades, is such that with the rudder bar and rudder 17 in normal neutral rudder position, the slidable shaft 85 is in such position that the propeller blades are held in neutral, with zero pitch or blade angle and without developing any substantial thrust. When the rudder bar 78 and rudder 17 are moved in either direction, the slidable shaft 85 is moved longitudinally, by bell crank 99, in the proper direction to set propeller blades 86 at a pitch or blade angle through the operation of cranks 89 and links 90, such that as propeller blades 86 are rotated with and around barrel 83, a thrust is developed acting laterally or transversely of the tail end of fuselage B in a direction to aid or boost the rudder effect. This feature of the invention is of particular utility and efficiency with the helicopter in hovering flight and is employed to maintain the desired directional control of fuselage B against "spinning" or rotation around the vertical axis of the rotating aerofoil assembly W. The mounting of variable pitch propeller V in tunnel 81 within the opposite fuselage side depressions 80, materially reduces interference by the propeller in forward motion of fuselage B, as the forward portions of the fuselage sides are spaced outwardly beyond the plane of propeller V, so that the air flow tends to uninterruptedly pass over and by the propeller and its mounting with the resulting minimum interference thereto.

With the helicopter designed, constructed and arranged, as illustrated herewith and described hereinbefore, to secure straight vertical flight, the control stick 67 is placed in what may be termed "neutral" position, that is, a position substantially vertical, so that the ring 52 and collar 55 are moved into substantially horizontal position on and around the spherical head 51 of shaft 50, through horizontal positioning of frames 56 and 60. Horizontal position of ring 52 positions all of the rock shafts 47, through rods 65, in normal position and maintains auxiliary stabilizing aerofoils S in normal flight relation to aerofoils 26. Shaft 50 is raised through control lever 76, which raises ring 52 and rods 65, resulting in actuation of rock shafts 47 to rotate aerofoils 26, through auxiliary aerofoils S, to the desired maximum angle of attack to develop the required lift, as will be understood from the foregoing detailed description of these features of the invention. After the controls are set as above described, application of power from motor M to the propellers P, causes rotation of the aerofoils 26 with column 20 around the vertical axis of the column, and enables the auxiliary stabilizing surfaces to rotate aerofoils 26 about shafts 21 so as to attain their maximum lift angle, and a vertical lift is thereby developed by the aerofoils 26 to result in vertical translation or flight of the helicopter. Rotation of column 20 with shafts 21 and rock shafts 47 therein coupled to rods 65, rotates the ring 52 on and around head 51, between collar 55 and the head which remain fixed so that the setting and arrangement of aerofoils 26 and auxiliary areofoils S is not disturbed or interfered with. During vertical translation the auxiliary stabilizing aerofoils S automatically function and operate to vary the incidence angles of aerofoils 26 as required by varying air flow conditions encountered to maintain the stability of the helicopter, in a manner hereinbefore explained.

In order to cause horizontal translation of the helicopter, the control stick 67 is moved forwardly which through rod 69 lowers the forward and elevates the rear arm of frame 60 on shaft 50 and causes the collar 55 through links 64 to assume a position on and around head 51 inclined forwardly to the horizontal, as shown in Fig. 4. Such position of collar 55 results in ring 52 rotating around head 51 in forwardly inclined position, so that as each rod 65 passes through the forward depressed quadrant of collar 55, it is lowered and rocks its respective shaft 47 and through the stabilizing aerofoils S connected therewith decreases the angle of incidence and the lift of its aerofoil 26 as it passes through the forward portion of its plane of rotation and as each rod 65 passes through the rearward raised quadrant of collar 55, it is raised and rocks its respective shaft 47 and through the stabilizing aerofoil S connected therewith increases the angle of attack and the lift of its aerofoil 26 as it passes through the rearward portion of its plane of rotation, while rods 65 in passing through the lateral quadrants bring the rock shafts 47 back to neutral, and the aerofoils S respectively connected thereto. Thus, the lift developed by each aerofoil 26 as it successively passes through the forward portion of its path is decreased, and the lift at that side of the helicopter is decreased while the lift developed by each aerofoil 26 as it successively passes through the rearward portion of its path is increased, and during the lateral portions remains as before, with the result that a horizontal component is developed in the total lift which causes horizontal translation of the helicopter in the direction desired.

With the helicopter translating horizontally, as above described, directional lateral control is secured by laterally moving the control stick 67 in the desired direction, which, through rocking frame 56 and links 59 will incline the collar 55 and ring 52 downwardly in such direction on the head 51, so that as ring 52 rotates around head 51 in such inclined position the rods 65 will be drawn downwardly as they pass around the downwardly inclined quadrant and will decrease the angle of incidence and the lift of the aerofoils 26 as they successively pass through the corresponding quadrant or portion of their plane of rotation thus creating momentarily a rolling moment in any desired direction, and if so maintained, a component of the lift is created acting in the same direction and translation or movement of the helicopter in that direction is obtained. It will be apparent that through operation of control stick 67 various positions of ring 52 can be obtained to secure various unequal lifts from the aerofoils 26 as they are rotated through their horizontal path, so that horizontally acting components of the lift are developed in any desired direction to insure complete arbitrary directional control of the helicopter under all flight conditions both vertical and horizontal. As previously referred to, the automatic stabilizing function of the auxiliary surfaces S is independent of and uninterrupted by the operation of these auxiliary surfaces by the pilot in securing directional control or in equally varying the angles of attack of all the main aerofoils 26 to control the rate of climb or descent in vertical translation or flight. The auxiliary aerofoils S function automatically in all positions imposed thereon by the arbitrary control and in all angles of attack given the main aerofoils 26 by the pilot's control, as will be clear by reference to the drawings in connection with the detailed description thereof.

It is also understood that the relation of the direction in which the collar 55 and ring 52 are inclined to the direction in which the control stick 67 is moved are hereinbefore referred to as one and the same direction for the purpose of simplicity in the explanation. In the embodiment of this invention it will be found necessary to shift this relationship somewhat, depending upon the individual machine in question, in order to compensate for aerodynamic lag in the response of the various control functions, and to allow for the gyroscopic effect hereinbefore mentioned, the relationship being so arranged that a forward motion of the control stick 67 causes a forward tipping of the aircraft.

Vertical descent with power is accomplished through the medium of the ascent-descent or control lever 76 to move shaft 50 with head 51 and ring 52 thereon to vary or adjust the angles of attack of main aerofoils 26 to develop a lift less than the force of gravity and thus cause descent of the helicopter, the rate of descent dependent on the angles and lift developed. If desired, for descent with power, the motor M can be controlled to reduce the power and hence the lift developed by aerofoils 26. In the case of descent without power, the aerofoils 26 will be rotated in their normal direction by the air flow because of the angles that the auxiliary stabilizing surfaces S cause them to automatically assume during descent and as rotated will develop a vertical lift which, through the proper use of control lever 76, may be used to check the rate of descent and permit of arbitrary control within limits, to permit of landing the helicopter.

While an aerofoil or lift surface assembly W is disclosed as composed of four aerofoils, the invention is not limited to such number, as any other number of aerofoils to give the required lift surface area may be employed and they may be arranged and mounted for rotation in a horizontal plane as is found expedient. The use of any number of propellers P for rotating the aerofoil assembly W is contemplated by the invention, which is not limited to two such propellers as shown in the example hereof. Further, in the example hereof aerofoil surfaces of the monoplane type are disclosed, but if desired or found expedient aerofoils of the multiplane type may be employed, as will be readily apparent to those skilled in the art.

It is also evident that various other changes, variations, modifications and substitutions might be resorted to without departing from the spirit and scope of my invention, and hence I do not desire to limit myself to the exact and specific disclosures hereof.

Desiring to protect my invention in the broadest manner legally possible, what I claim and desire to secure by Letters Patent of the United States, is:

1. In a helicopter, a fuselage, a hollow mast mounted in vertically disposed position on and rotatably journaled in bearings carried by the fuselage, said mast extending upwardly above the fuselage and provided at its outer end with radially and horizontally disposed hollow shafts fixed thereon, aerofoils longitudinally mounted on said hollow shafts and disposed extending radially from said mast for rotation therewith in a horizontal plane, propellers mounted and supported from certain of said radial shafts for rotation in a vertical plane, a motor within the fuselage, and driving mechanism from the motor to the propellers for rotating the latter, said mechanism extending upwardly through said hollow mast and outwardly through said radially disposed hollow shafts.

2. In a helicopter, a fuselage, a hollow mast vertically disposed on and extending upwardly above said fuselage, said mast mounted for free rotation on the fuselage, a series of hollow shafts at the upper end of said mast extending radially therefrom, a series of aerofoils mounted on said shafts extending longitudinally thereof, respectively, for rotation in a horizontal plane with said mast, propeller shafts mounted on and carried by certain of said hollow shafts and extending horizontally therefrom beyond the aerofoils mounted thereon, respectively, propellers on said propeller shafts mounted for rotation in a vertical plane thereby, a motor within the fuselage, a drive shaft connected with said motor and extending upwardly through said rotatable hollow mast, a bevel gear on the upper end of said drive shaft, and shafts extending longitudinally through said hollow aerofoil mounting shafts on which the propeller shafts are mounted respectively, and coupled with said propeller shafts, and bevel gears on the inner ends of the shafts disposed in said hollow shafts, said gears in mesh with the gear on the end of the drive shaft and rotatable therearound with the mast and said hollow shafts.

3. In a helicopter, a main aerofoil rotatable in a horizontal plane around a vertical axis, a substantially horizontally disposed shaft on which said main aerofoil is mounted for rotation thereon as an axis to vary the angle of attack thereof, a support truss carried by and extended beyond the main aerofoil, an auxiliary aerofoil pivotally mounted on said truss for rotation on a substantially horizontal axis to vary its angle of attack, a member carried by said main aerofoil shaft and extending outwardly through the main aerofoil, and a connection extending between and pivotally coupled to said member and the auxiliary aerofoil.

4. In a helicopter, a main aerofoil rotatable in a horizontal plane around a vertical axis, a substantially horizontally disposed support shaft on which said main aerofoil is longitudinally mounted for rotation thereon as an axis to vary its angle of attack, a supporting truss mounted on said aerofoil extending transversely thereof and therebeyond an auxiliary aerofoil pivotally mounted and substantially horizontally disposed on the outer end of said truss for rotation thereon to vary its angle of attack, a vertically disposed member carried by said shaft in normally fixed position and extending outwardly through a transverse slot in the main aerofoil, and a connection extending between and pivotally connected to the outer end of said member and said auxiliary aerofoil.

5. In a helicopter, main aerofoils rotatable in a normally horizontal plane around a vertical axis, each aerofoil rotatable on a substantially horizontal axis to vary the angle of attack thereof, auxiliary aerofoils carried by said main aerofoils, respectively, and operatively associated therewith for independently varying the angles of attack of the main aerofoils, said auxiliary aerofoils automatically actuated by variations in the airflow acting thereon to vary the respective angles of attack of the main aerofoils and maintain the total lift developed by said main aerofoils substantially a constant, and pilot's control mechanism for selectively causing said auxiliary aerofoil to vary the angles of attack of the main aerofoils, respectively.

6. In a helicopter, main aerofoils rotatable in a normally horizontal plane and independently rotatable on a substantially horizontal axis to vary the angles of attack thereof, an auxiliary aerofoil carried by each main aerofoil and operably associated therewith for independent actuation by the airflow to vary the angles of attack, respectively, of the main aerofoils in accordance with variations in the airflow, and pilot's control mechanism operatively coupled with said auxiliary aerofoils for actuation to selectively vary the angles of attack of the main aerofoils simultaneously with and indenpendently of the operation of the auxiliary aerofoils by the airflow.

7. In a helicopter, main aerofoils rotatable in a normally horizontal plane around a vertical axis and each rotatable around a substantially horizontal axis to vary the angles of attack thereof, an auxiliary aerofoil carried by each main aerofoil in operative association therewith and actuated by variations in the airflow to rotate the respective main aerofoil to change its angle of attack, said auxiliary aerofoils and main aerofoils, controlled thereby, independently operable to maintain the helicopter in equilibrium, and pilot operated control mechanism connected with said auxiliary aerofoils for operation thereof independently of and during actuation by the airflow, to vary the angles of attack of the main aerofoils to secure directional, lateral and longitudinal control of the helicopter.

8. In a helicopter, main aerofoils rotatable in a normally horizontally plane around a vertical axis, means carried by each aerofoil and actuated by the variations in airflow velocity to change the angle of attack of the main aerofoil in accordance with the airflow velocity and direction to maintain the equilibrium of the helicopter, and pilot controlled mechanism for operating said means to selectively vary the angles of attack of the main aerofoils to directionally, laterally and longitudinally control translation of the helicopter, simultaneously with and independently of the actuation of said means by the airflow.

9. In a helicopter, main aerofoils rotatable in a normally horizontal plane around a vertical axis, means actuated by variations in airflow velocity and direction for varying the angles of attack of the main aerofoils, respectively, to maintain in a correct amount the lift developed thereby parallel to the axis of rotation, and pilot controlled mechanism for operating said means to arbitrarily decrease the angles of attack and the lift of said aerofoils as they successively pass through a desired point in the plane of rotation, the pilot control of said means operable independently of and simultaneously with the actuation thereof by the airflow.

10. In a helicopter, main aerofoils rotatable in a normally horizontal plane around a vertical axis and each rotatable on a substantially horizontal axis to vary the angle of attack thereof, auxiliary aerofoils carried by said main aerofoils, and operatively coupled therewith for rotating the same, respectively, to vary the angles of attack thereof, said auxiliary aerofoils actuated by variations in velocity and direction of the airflow to change the angles of attack of the main aerofoils with which they are connected, respectively, to maintain in a correct amount the lift developed by the aerofoils parallel to the vertical axis of rotation, pilot controlled mechanism for operating said auxiliary aerofoils to change the angles of attack to decrease the lift of the main aerofoils as they pass through a selected portion of the plane of rotation, pilot controlled means operable independently of said mechanism for simultaneously equally varying the normal angles of all the aerofoils, and said auxiliary aerofoils actuated by the airflow simultaneously with and independently of said pilot controlled mechanism and means.

11. In a helicopter, a fuselage, an aerofoil assembly mounted thereabove and carried thereby for rotation in a horizontal plane, a rudder on said fuselage, and a variable pitch propeller mounted on the fuselage for rotation in a vertical plane on an axis transverse of the fuselage, said propeller operatively connected with the rudder to develop a thrust acting on the fuselage in the direction in which the fuselage is turned by the rudder.

12. In a helicopter, a fuselage, an aerofoil assembly mounted thereabove and carried thereby for rotation in a horizontal plane, a motor for rotating said aerofoil assembly, a rudder on the fuselage for lateral directional control thereof, a variable pitch propeller mounted on the fuselage for rotation in a vertical plane on an axis transverse of the fuselage, drive mechanism from said motor to the propeller, and operating mechanism for changing the pitch of the propeller connected with and controlled from said rudder to cause the propeller to develop a thrust acting to turn the fuselage laterally in the direction turned by the rudder.

13. In a helicopter, a fuselage, an aerofoil assembly mounted in position thereabove and carried thereby for rotation in a horizontal plane, a motor for rotating said aerofoil assembly, a rudder on the fuselage for lateral directional control thereof, control mechanism for said rudder, a variable pitch propeller mounted on the fuselage for rotation in a vertical plane on an axis transverse of the fuselage, operating connections from the motor to said propeller for rotating the latter, and operating mechanism for varying the pitch of said propeller coupled to and controlled by the rudder control mechanism to vary the pitch of said propeller to develop a thrust acting in accordance with the position of said rudder to aid in directional lateral control of the fuselage.

14. In a helicopter, a main aerofoil rotated in a normally horizontal plane around a vertical axis and mounted longitudinally of a substantially horizontal shaft for rotation thereon as an axis to vary its angle of attack, an auxiliary aerofoil supported from and carried by the main aerofoil in substantially horizontally disposed position for rotation to vary its angle of attack, a rock shaft carried by said main aerofoil shaft, a member fixed on said rock shaft, a link extending between and pivotally coupled with said member and auxiliary aerofoil actuated by variations in airflow velocity and direction to change the angle of attack of the main aerofoil, and pilot controlled mechanism for operating said rock shaft to rotate said auxiliary aerofoil and vary the angle of attack of the main aerofoil, simultaneously with and independently of the actuation of the auxiliary aerofoil by the airflow.

15. In a helicopter, main aerofoils rotatable in a normally horizontal plane around a vertical axis, auxiliary aerofoils actuated by variations in airflow velocity and direction for independently varying the angles of attack of the main aerofoils to maintain the lift respectively developed thereby substantially a constant and parallel to the vertical axis of rotation thereof, and pilot controlled mechanism for selectively operating said auxiliary aerofoils during and simultaneous with their actuation by the airflow, to vary the angle of attack of the main aerofoils to secure directional control of the helicopter.

16. In a helicopter, in combination, aerofoils normally rotatable in a substantially horizontal plane, means actuated and controlled by variations in airflow velocity and direction for varying the angles of attack of said aerofoils, respectively, to maintain the lift developed thereby, substantially a constant, pilot controlled means for operating said airflow actuated means to selectively vary the angles of attack of the aerofoils, and a second pilot controlled means for simultaneously equally varying the angles of attack of the aerofoils, the said first mentioned and second pilot controlled means independently operable simultaneously with but independently of the airflow actuation of said aerofoil angle varying means.

17. In a helicopter, in combination, aerofoils normally rotatable in a substantially horizontal plane, means automatically actuated and controlled by variations in airflow velocity and direction for changing the angles of attack of said aerofoils, respectively, to maintain the lift developed thereby substantially a constant, and pilot controlled mechanism for simultaneously equally varying the angles of attack of the aerofoils, and for selectively varying the angles of attack, thereof to maintain lateral and longitudinal balance and translation in any direction.

18. In a helicopter, main aerofoils normally rotatable in a substantially horizontal plane and each rotatable on an axis longitudinally thereof for varying the angles of attack, auxiliary aerofoils carried by said main aerofoils and operatively coupled therewith for rotating the main aerofoils to vary their angles of attack, respectively, said auxiliary aerofoils each rotatable on a substantially horizontal axis and actuated by variations in airflow velocity and direction to change their angles of attack and vary the angles of attack of the main aerofoils, with which operatively connected, respectively, and pilot controlled means for simultaneously and equally changing the angles of attack of the auxiliary aerofoils to vary the angles of attack of the main aerofoils, simultaneously with but independently of the airflow actuation of the auxiliary aerofoils.

19. In a helicopter, main aerofoils normally rotatable in a substantially horizontal plane, auxiliary aerofoils carried by said main aerofoils and operatively coupled therewith for varying the angles of attack of the main aerofoils, respectively, said auxiliary aerofoils mounted for rotation to change their angles of attack and actuated by variations in airflow direction and velocity to vary the angles of attack of the main aerofoils, and pilot controlled means for selectively varying the angles of attack of the main aerofoils through operation of the auxiliary aerofoils, simultaneously with and during the airflow actuation of the auxiliary aerofoils to vary the angles of attack of the main aerofoils.

20. In combination, in a helicopter embodying aerofoils normally rotatable in a substantially horizontal plane, pilot controlled means for selectively varying the angles of attack of the aerofoils to maintain lateral and longitudinal balance and translation in any direction, pilot controlled means for simultaneously equally varying the angles of attack of all the aerofoils independently of and during variation by said selective means, and means actuated and controlled by variations in airflow velocity and direction for automatically varying the angles of attack of the main aerofoils to maintain the lift developed thereby substantially a constant, the said airflow actuated means operable simultaneously with but independently of operation of the said pilot controlled means.

21. In a helicopter embodying main aerofoils normally rotatable in a substantially horizontal plane and independently operable to vary their angles of attack, an auxiliary aerofoil carried by each main aerofoil and operable to vary its angle of attack, the auxiliary aerofoils operatively coupled with their respective main aerofoils and actuated by variations in airflow velocity and direction to vary the angles of attack of the main aerofoils with which coupled to maintain the lift developed thereby substantially a constant, and the said auxiliary aerofoils mounted and coupled with respect to the main aerofoils to cause variation in the relative angles between the main aerofoils and auxiliary aerofoils as the angles of attack of the main and auxiliary aerofoils are varied through action of the airflow on the auxiliary aerofoils.

22. In a helicopter, a fuselage, a mast mounted in substantially vertically disposed position on and rotatably journalled in bearings carried by the fuselage, said mast extending upwardly above the fuselage and provided at its outer end with radially and substantially horizontally disposed shafts thereon, aerofoils longitudinally mounted on said shafts for vertical rotation to vary their angles of attack, said aerofoils extending radially from said mast for rotation therewith in a normally horizontal plane, means for rotating said mast and aerofoils, and mechanism for individually rotating said aerofoils to vary their angles of attack, embodying a spherical member mounted concentric with the mast axis fixed against rotation, an annular member rotatably mounted on said spherical member in normal substantially horizontal position therearound, connections from each aerofoil to said annular rotatable member, and means for tilting said annular member in any direction to operate said connections to vary the angles of attack of said aerofoils.

23. In a helicopter, a fuselage, a rotatable mast mounted in substantially vertically disposed position on said fuselage, aerofoils mounted on and extending radially from said mast spaced outwardly from the fuselage for rotation with the mast in a normally horizontal plane, means for rotating said mast and aerofoils, the said aerofoils vertically rotatable to vary their angles of attack, a spherical member mounted concentric with said mast fixed against rotation, an annular member rotatably mounted on and around said spherical member in a normally horizontal plane, connections from each aerofoil to said annular member for rotating the aerofoil to vary its angle of attack, and means for tilting said annular member in any direction to actuate said connections and correspondingly vary the angles of attack of said aerofoils, respectively.

24. In a helicopter, a wing unit embodying a main aerofoil rotatable on an axis disposed substantially longitudinally thereof to vary its angle of attack, and a stabilizing aerofoil carried by said main aerofoil, the center of gravity of said wing unit removed from the axis of rotation of said main aerofoil, and said stabilizing aerofoil actuated by variations in airflow acting thereon to increase the angle of attack of the main aerofoil when the airflow acting thereon tends to decrease the lift developed by the main aerofoil, and to decrease the angle of attack when the airflow tends to increase the lift.

25. In a helicopter, aerofoils rotatable in a normally horizontal plane around a substantially vertical axis, each of said aerofoils rotatable on an axis disposed substantially longitudinally thereof to permit of varying its angle of attack, and a stabilizing member carried by each aerofoil and controlled by variations in the airflow acting thereon to vary the angle of attack of its respective aerofoil, the center of gravity of each aerofoil and stabilizing member carried thereby removed from the longitudinal axis of rotation of the aerofoil and so located with respect thereto that upon variation of the airflow tending to increase the lift developed by the aerofoil the stabilizing member thereof reduces the angle of attack of the aerofoil and on airflow variation tending to decrease the lift of the aerofoil increases the angle of attack thereof, whereby the lift developed by each aerofoil is maintained substantially a constant.

26. In a helicopter, means for developing a direct vertical lift, means actuated by variations in airflow to cause said lift means to develop and automatically maintain the lift substantially a constant and the helicopter in equilibrium, and pilot controlled mechanism for operating said airflow actuated means simultaneously with and independently of the airflow actuation of such means, to maintain lateral and longitudinal balance and to cause translation of the helicopter in any direction.

27. In a helicopter, in combination, aerofoils mounted for rotation in a normally horizontal plane around a vertical axis, each of said aerofoils independently operable to vary the lift developed thereby, and means carried by each aerofoil and operatively associated therewith for actuation by variations in the velocity and direction of the airflow acting thereon to operate the aerofoil to increase the lift developed thereby under airflow variations tending to decrease the lift and to decrease the lift under airflow variations tending to increase the lift and thereby maintain the lift substantially a constant, the said aerofoil carried and airflow actuated means automatically maintaining the total lift developed by said aerofoils substantially a constant and the helicopter in equilibrium under varying airflow conditions.

28. In a helicopter, a series of aerofoils mounted for rotation in a normally horizontal plane around a vertical axis, each of said aerofoils mounted to permit of varying its angle of attack, and means carried by and operatively coupled with each aerofoil for actuation by variations in the velocity and direction of the airflow acting thereon, independently of the other airfoils of the series to increase the angle of attack of the aerofoil under airflow variations tending to decrease the lift developed by the aerofoil and to decrease the angle of attack under variations tending to increase the lift of the aerofoil, the said aerofoil carried and airflow actuated means operatively coupled to said aerofoils, respectively, as to automatically operating the aerofoils to vary their angles of attack in accordance with airflow variations and maintain the total lift developed by the aerofoils substantially a constant and the helicopter in equilibrium.

29. In a helicopter, main aerofoils rotatable in a normally horizontal plane around a vertical axis and each rotatable on an axis longitudinally thereof for varying the angle of attack of each aerofoil independently of the others, an auxiliary aerofoil carried by and operatively associated with each main aerofoil for actuation by variations in velocity and direction of the airflow acting thereon to rotate the main aerofoil and vary its angle of attack, and the said auxiliary aerofoils so arranged with respect to and operatively associated with the main aerofoils, respectively, as to be actuated by an increase in airflow velocity to decrease the angles of attack, and by a decrease in airflow velocity to increase the angles of attack, of the main aerofoils, respectively, and automatically maintain the lift developed by the main aerofoils substantially a constant and approximately parallel to the vertical axis about which the main aerofoils rotate.

30. In a helicopter, a main aerofoil rotatable in a normally horizontal plane around a vertical axis, said aerofoil rotatable on an axis longitudinally thereof to vary its angle of attack and the lift developed thereby, an auxiliary aerofoil carried by said main aerofoil, said auxiliary aerofoil mounted for rotation to vary its angle of attack and rotated by variations in the velocity and direction of the air-flow acting thereon, and operative connections from the auxiliary aerofoil to the main aerofoil so arranged that rotation of the auxiliary aerofoil rotates the main aerofoil to change its angle of attack in accordance with variations in the airflow acting thereon to maintain the lift developed thereby substantially a constant.

31. In a helicopter, a main aerofoil rotatable in a normally horizontal plane around a vertical axis, a horizontally disposed support for the main aerofoil on which the aerofoil is rotatable to vary the angle of attack thereof and the lift developed thereby, an auxiliary aerofoil carried by the main aerofoil, said auxiliary aerofoil rotatably mounted and rotated by variations in the velocity and direction of the airflow acting thereon to vary its angle of attack to the airflow, and operative connections from the auxiliary aerofoil to said main aerofoil support, said connections so arranged that rotation of the auxiliary aerofoil rotates the main aerofoil to vary the angle of attack thereof and the lift developed thereby in accordance with variations in the airflow acting thereon.

32. In a helicopter, a series of wing units rotatable in a normally horizontal plane around a vertical axis, each of said wing units rotatable on an axis disposed substantially longitudinally thereof to vary its angle of attack and arranged and mounted with the center of gravity off the longitudinal axis about which the unit rotates to vary its angle of attack, said wing units independently rotated to vary their angles of attack, respectively, by variations in the velocity and direction of the airflow acting thereon, the center of gravity of each wing unit so located thereon that with the airflow acting on the unit to increase the lift the unit is rotated to decrease its angle of attack and with the airflow acting thereon to decrease the lift the unit is rotated to increase its angle of attack, and the said wing units automatically operated by the airflow acting thereon, respectively, to maintain the lift developed thereby substantially a constant and the helicopter in equilibrium under varying airflow conditions.

33. In a helicopter, aerofoils mounted for rotation in a normally horizontal plane around a vertical axis, each of said aerofoils independently operable to vary the lift developed thereby, means carried by each aerofoil and operatively associated therewith for actuation by variations in the velocity and direction of the airflow acting thereon to operate the aerofoil and vary the lift developed thereby in accordance with the airflow variations to maintain the lift substantially a constant, and pilot controlled mechanism for operating said airflow actuated means to cause operation of the aerofoils, respectively, and vary their angles of attack for lateral and longitudinal balance and to cause translation of the helicopter in any direction, said mechanism operable simultaneously with and during automatic functioning of the airflow actuated means, and the said airflow actuated means automatically operating to cause the aerofoils to establish and maintain a substantially constant lift under all conditions imposed on the aerofoils by the pilot controlled mechanism.

Signed at Phoebus, Virginia, this 20th day of June, 1925.

MAITLAND B. BLEECKER.